United States Patent
Kitano et al.

(10) Patent No.: US 7,481,053 B2
(45) Date of Patent: Jan. 27, 2009

(54) HYDRAULIC PRESSURIZER SYSTEM

(75) Inventors: Kazuhiko Kitano, Wako (JP); Osahide Miyamoto, Wako (JP); Tomohisa Kaneda, Wako (JP); Koichi Fushimi, Wako (JP); Ryuichi Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 479 days.

(21) Appl. No.: 11/289,519

(22) Filed: Nov. 30, 2005

(65) Prior Publication Data
US 2006/0120876 A1 Jun. 8, 2006

(30) Foreign Application Priority Data
Dec. 2, 2004 (JP) ............................. 2004-349644

(51) Int. Cl.
*F16D 31/02* (2006.01)
(52) U.S. Cl. .............................. 60/428; 60/431; 60/329
(58) Field of Classification Search .................. 60/329, 60/375, 428, 431, 486
See application file for complete search history.

(56) References Cited

U.S. PATENT DOCUMENTS

2004/0029677 A1 * 2/2004 Mori et al. ..................... 477/3

FOREIGN PATENT DOCUMENTS

JP 2000-104587 4/2000

* cited by examiner

*Primary Examiner*—Michael Leslie
(74) *Attorney, Agent, or Firm*—Westerman, Hattori, Daniels & Adrian, LLP.

(57) ABSTRACT

A hydraulic pressurizer system comprises a drive source, which drives a hybrid vehicle, a mechanical oil pump, which is driven by the drive source, an electrical motor, which is activated by a 12V battery, an electrical oil pump, which is driven by the electrical motor, and a control unit, which activates the electrical motor. The pressurizer further comprises a ratio-change mechanism, which is activated by hydraulic oil supplied by the mechanical oil pump and by the electrical oil pump to establish a speed change ratio, at which the rotational driving force of the drive source is transmitted to wheels with a rotational speed change. The control unit memorizes a characteristic value, which is specified from the temperature of the hydraulic oil and from the rotational speed of the electrical motor, and a threshold value for the rotational speed of the electrical motor, which threshold value corresponds to the characteristic value.

5 Claims, 7 Drawing Sheets

HYDRAULIC PRESSURIZER SYSTEM

FIELD OF THE INVENTION

The present invention relates to a hydraulic pressurizer system, which is used, for example, in a hybrid vehicle and which supplies hydraulic oil to the ratio-change mechanism and the like by an electrically driven oil pump while the engine is not in operation.

BACKGROUND OF THE INVENTION

A hybrid vehicle is driven by a drive source that is a combination of an engine and a motor capable of electricity generation (motor generator), and such a vehicle has been developed for improving fuel efficiency and for reducing exhaust gas in environmental protection. Typically, a hybrid vehicle is controlled for stopping the engine when the vehicle stops in so-called idling-elimination. In this case, when the engine stops, the mechanically driven oil pump, which has been in operation for supplying hydraulic oil, for example, to the ratio-change mechanism, also stops. Therefore, for complementarity, an electrically driven oil pump or electrical oil pump is provided to supply hydraulic oil only while the engine is not in operation under the idling-elimination control, the electrical oil pump being driven by an electrical motor, which receives electric power from the battery (refer to, for example, Japanese Laid-Open Patent Publication No. 2003-307271).

In this case, the required hydraulic pressure applied with oil by the electrical oil pump is achieved by controlling the torque of the electrical motor, which drives the pump. However, the hydraulic pressure applied by the electrical oil pump is dependent on the viscosity of the oil. If the viscosity changes as the temperature of the oil changes, then the hydraulic pressure cannot be achieved appropriately by the electrical oil pump. For this reason, there is known a hydraulic pressurizer system that controls to cancel or prohibit stop-engine-idling control if the temperature of the oil is not within a predetermined range and supplies hydraulic oil only from the mechanical oil pump, which is being driven continuously by the engine without any interruption from the idling-stop control (refer to, for example, Japanese Laid-Open Patent Publication No. 2000-104587).

However, if the idling-stop control is always cancelled or prohibited while the temperature of the hydraulic oil is out of the range, then the effectiveness of idling-elimination is limited by the performance of the electrical oil pump or by the temperature range for the operation of the electrical oil pump in a case where this range is narrower than the temperature range for the operation of the automatic ratio-change mechanism. As manufactured products, electrical oil pumps and ratio-change mechanisms often have different or individual performances, respectively, because of their uneven product qualities or of their individual aging. On this background, if the idling-stop control is to be cancelled or prohibited depending on the oil temperature in all cases, then the systems must be designed to meet the lowest performance possible in the operation (or the narrowest temperature range for the operation) of electrical oil pumps and ratio-change mechanisms. This leads to a problem of inefficient performance by the hydraulic pressurizer system in idling-elimination.

SUMMARY OF THE INVENTION

It is an object of the present invention to provide a hydraulic pressurizer system that determines, in correspondence to a characteristic value, the rotational speed of the electrical oil pump (or the electrical motor) at which the idling-stop control is cancelled.

A hydraulic pressurizer system according to a first aspect of the present invention comprises a drive source (for example, the engine 2 and the motor generator 4 described in the following embodiment) for driving a vehicle, a mechanical oil pump, which is driven by the drive source, an electrical motor, which is activated by a battery (for example, the 12V battery 24 described in the following embodiment), an electrical oil pump, which is driven by the electrical motor, a ratio-change mechanism (for example, the automatic ratio-change mechanism 7 described in the following embodiment), and a control unit, which activates the electrical motor. The ratio-change mechanism is actuated by means of hydraulic oil being supplied from the mechanical oil pump and from the electrical oil pump for establishing a speed change ratio, at which the rotational driving force from the drive source is transmitted to wheels with a rotational speed change. In the hydraulic pressurizer system, when the control unit, having stopped the drive source, activates the electrical motor to output a predetermined torque, and if the rotational speed of the electrical motor exceeds a limit value while the hydraulic oil is being supplied from the electrical oil pump to the ratio-change mechanism, then the control unit controls the rotational speed of the electrical motor to become equal to the limit value.

In the first aspect of the present invention, preferably, the hydraulic pressurizer system is constructed such that if the pump-driving torque of the electrical motor becomes equal to or smaller than a predetermined value while the control unit is controlling the rotational speed of the electrical motor to the limit value, then the control unit starts the drive source to supply the hydraulic oil from the mechanical oil pump to the ratio-change mechanism and then stops the electrical oil pump.

A hydraulic pressurizer system according to a second aspect of the present invention comprises a drive source for driving a vehicle, a mechanical oil pump, which is driven by the drive source, an electrical motor, which is activated by a battery, an electrical oil pump, which is driven by the electrical motor, a ratio-change mechanism, and a control unit, which activates the electrical motor. The ratio-change mechanism is actuated by means of hydraulic oil being supplied from the mechanical oil pump and from the electrical oil pump for establishing a speed change ratio, at which the rotational driving force from the drive source is transmitted to wheels with a rotational speed change. In the hydraulic pressurizer system, the control unit stores in memory a characteristic value, which is calculated from the temperature of the hydraulic oil and the rotational speed of the electrical motor, and a threshold value for the rotational speed of the electrical motor, which value corresponds to the characteristic value. While the control unit, having stopped the drive source, is supplying the hydraulic oil from the electrical oil pump to the ratio-change mechanism, if the rotational speed of the electrical motor becomes equal to or higher than the threshold value, which is determined for the rotational speed from the characteristic value, then the control unit starts the drive source to supply the hydraulic oil from the mechanical oil pump to the ratio-change mechanism and then stops the electrical oil pump.

It is preferable that the hydraulic pressurizer system according to the second aspect of the present invention further comprise an oil-temperature sensor, which detects the temperature of the hydraulic oil, and that the control unit, having started the electrical oil pump, calculate a new characteristic value from the temperature detected by the oil-temperature sensor and from the rotational speed of the electrical motor and update the characteristic value stored in memory.

In the hydraulic pressurizer system according to either the first aspect or the second aspect of the present invention, it is preferable that the electrical motor comprise a three-phase brush-less sensor-less motor.

In the hydraulic pressurizer system according to the first aspect of the present invention, which is constructed as described above, the electrical motor is never overdriven. This is because if the rotational speed of the electrical motor reaches a limit value in response to a rise in the oil temperature while the electrical motor is being controlled to output a constant torque, then the electrical motor is controlled to remain at the limit value.

In a case where the electrical motor is operated to remain at the limit value, if the pump-driving torque becomes equal to or smaller than a predetermined value, then the control unit starts the drive source to supply the hydraulic oil from the mechanical oil pump to the ratio-change mechanism and then stops the electrical oil pump (canceling the so-called idling-stop control). In this way, the control unit maintains the hydraulic pressure necessary for the operation of the ratio-change mechanism.

In the hydraulic pressurizer system according to the second aspect of the present invention, which is constructed as described above, the operational range of the electrical oil pump is determined individually from a characteristic value for each product of the electrical oil pump or the ratio-change mechanism because each product has an individual deviation in manufactured quality. As a result, the determination for canceling the idling-stop control can be executed in consideration of the performance of the individual hydraulic pressurizer system.

In the hydraulic pressurizer system according to the second aspect, the control unit, having started the electrical oil pump, calculates a new characteristic value from the temperature detected by the oil-temperature sensor and from the rotational speed of the electrical oil pump and updates the characteristic value stored in memory. With this arrangement, it is possible that the cancellation of the idling-stop control be determined from the characteristic value that corresponds to the aging of the electrical oil pump or the ratio-change mechanism.

Moreover, the hydraulic pressurizer system according to either the first aspect or the second aspect of the present invention, whose electrical motor is a three-phase brush-less sensor-less motor, is energy-efficient and is manufactured cost-effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
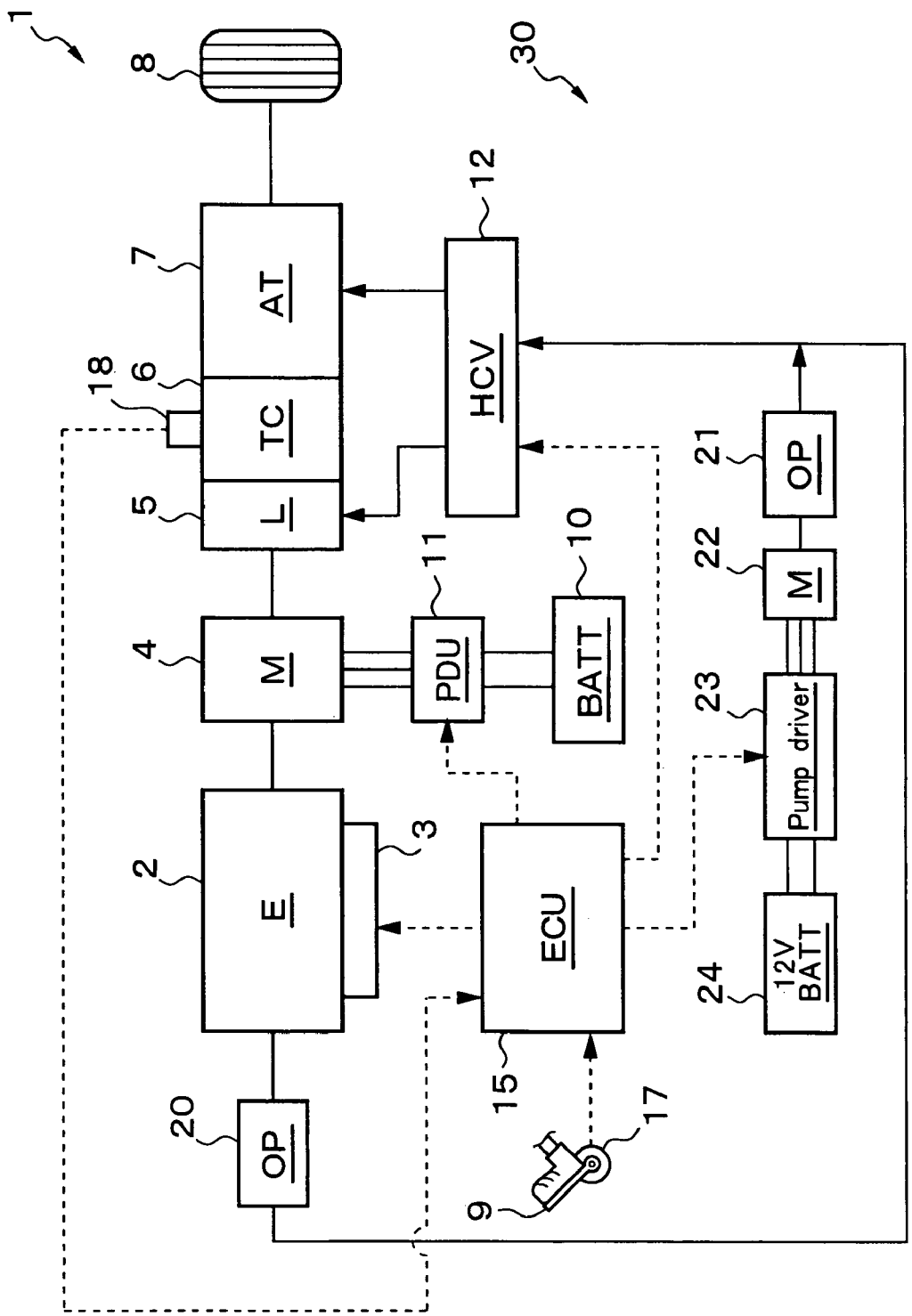
FIG. 1 is a block diagram describing the construction of the drive system of a hybrid vehicle, which is equipped with a hydraulic pressurizer system according to the present invention.

Now, preferred embodiments according to the present invention are described in reference to the drawings. At first, the construction of the drive system of a hybrid vehicle, which is equipped with a hydraulic pressurizer system according to the present invention, is described in reference to FIG. 1.

This hybrid vehicle 1 comprises an engine 2 and an electricity-generating motor (referred to as motor generator) 4 as drive sources, which are connected in series. The vehicle also comprises a torque converter 6, which is connected to the drive sources and equipped with a lock-up clutch 5, and an automatic ratio-change mechanism 7, whose output shaft is connected to drive wheels 8. In this arrangement, the driving force applied alternatively from the engine 2 or the motor generator 4 or simultaneously from these two is transmitted through the torque converter 6 with the lock-up clutch 5 and the automatic ratio-change mechanism 7 to the wheels 8, driving the hybrid vehicle 1, with rotational speed changes being effected by the torque converter 6 and the automatic ratio-change mechanism 7.

In addition, the driving force from the wheels 8 during the deceleration (coasting) of the vehicle, after the accelerator pedal 9 is released from its stepped down position, is transmitted through the automatic ratio-change mechanism 7 and the torque converter 6 with the lock-up clutch 5 to the drive sources. In this case, an engine brake action (braking action by the friction torque of the engine) is effected by the engine 2, and the motor generator 4 is driven by the driving force for electricity generation (energy regeneration).

The engine 2 is a multi-cylinder reciprocating engine, and it is equipped with a controller 3 for engine operation. The controller 3 controls the fuel injection to and the ignition of each cylinder. In addition, it also controls the operation of the suction and exhaust valves of each cylinder and can close the valves of each cylinder for turning the respective cylinders off. The controller 3, which itself is under the control of a control unit 15 described later, executes the automatic start and stop of the engine 2 (so-called, idling-elimination control) and executes a cylinder-off control, which closes the suction and exhaust valves of some or all of the cylinders.

The input member and the output member (the pump member and the turbine member) of the torque converter 6 are engaged or disengaged with each other by the lock-up clutch 5. In the condition where the lock-up clutch 5 is released, the rotational driving force is transmitted between the drive sources (the engine 2 and the motor generator 4) and the automatic ratio-change mechanism 7 through the torque converter 6. On the other hand, if the lock-up clutch 5 is engaged, then the torque converter 6 is bypassed, and the drive sources (the output shaft of the motor generator 4) are connected directly to the input shaft of the automatic ratio-change mechanism 7. The lock-up clutch 5 is actuated for engagement and disengagement by a hydraulic control valve 12, whose operation is controlled by the control unit 15. In other words, the lock-up clutch 5 is controlled for engagement and disengagement by the control unit 15.

The automatic ratio-change mechanism 7 is a ratio-change mechanism that has a plurality of gear trains, of which one desirable train is automatically set in correspondence to the driving condition of the vehicle. This automatic shifting is controlled by a hydraulically actuated shift clutch, whose hydraulic pressure is supplied through the hydraulic control valve 12, which is controlled by the control unit 15. In other words, the automatic shift control is executed by the control unit 15 in correspondence to the driving condition of the vehicle.

The motor generator 4 is driven by the electrical power being supplied from a battery 10 through a power drive unit (PDU) 11, which is controlled by the control unit 15. In other words, the operation of the motor generator 4 is controlled by the control unit 15. In addition, the motor generator 4 is driven by the driving force received from the wheels 8 when the hybrid vehicle 1 is in deceleration. In this case, the motor generator 4 functions as an electric generator that generates energy and also a braking force. As a result, the motor generator 4 converts energy from the kinetic energy of the vehicle to electrical energy, which is recovered through the power drive unit 11 to charge the battery 10. This energy regeneration is also controlled by the control unit 15 through the power drive unit 11.

By the way, in the hybrid vehicle 1, the hydraulic pressure source (hydraulic pressurizer system 30) for the lock-up clutch 5 and the automatic ratio-change mechanism 7 comprises a mechanically driven oil pump 20 and an electrically driven oil pump 21. The mechanical oil pump 20 is connected to the drive sources (to the engine 2 and the motor generator 4) and is driven by the driving force from the drive sources. In FIG. 1, the mechanical oil pump 20 is shown beside the engine 2 for simplifying the description, but, it is actually positioned between the torque converter 6 and the automatic ratio-change mechanism 7.

On the other hand, the electrical oil pump 21 is driven by an electrical motor 22, which is, in turn, operated by a pump driver 23. The pump driver 23, which itself is controlled by the control unit 15, controls the electrical power being supplied from a 12V battery 24 to the motor 22. As mentioned above, when the mechanical oil pump 20 stops applying the hydraulic pressure because the engine 2 has stopped under the idling-elimination control executed by the control unit 15, the electrical motor 22 is operated through the pump driver 23 by the control unit 15 for driving the electrical oil pump 21, which supplies hydraulic oil. The electrical motor 22 comprises a three-phase sensor-less brush-less motor, which is more efficient than a direct-current brush motor and is simpler in construction and cheaper than a brush-less sensor motor.

For the control unit 15 to control the operation of the engine-operation controller 3, the hydraulic control valve 12, the power drive unit 11, and the pump driver 23 as described above, the control unit 15 receives various detection signals, for example, as shown in the drawing, a detection signal from an accelerator sensor 17, which detects the stepping on the accelerator pedal 9, and a detection signal from a rotation sensor 18, which detects the input and output rotational speeds of the torque converter 6. In addition, it receives a detection signal from a vehicle speed sensor for the vehicle speed, a detection signal from an engine rotation sensor for the rotational speed of the engine, a detection signal for the shift position of the transmission, a detection signal from a brake sensor for the brake actuation, and a detection signal for the remaining charge of the battery 10, though they are not illustrated in the drawing.

Figure 2:
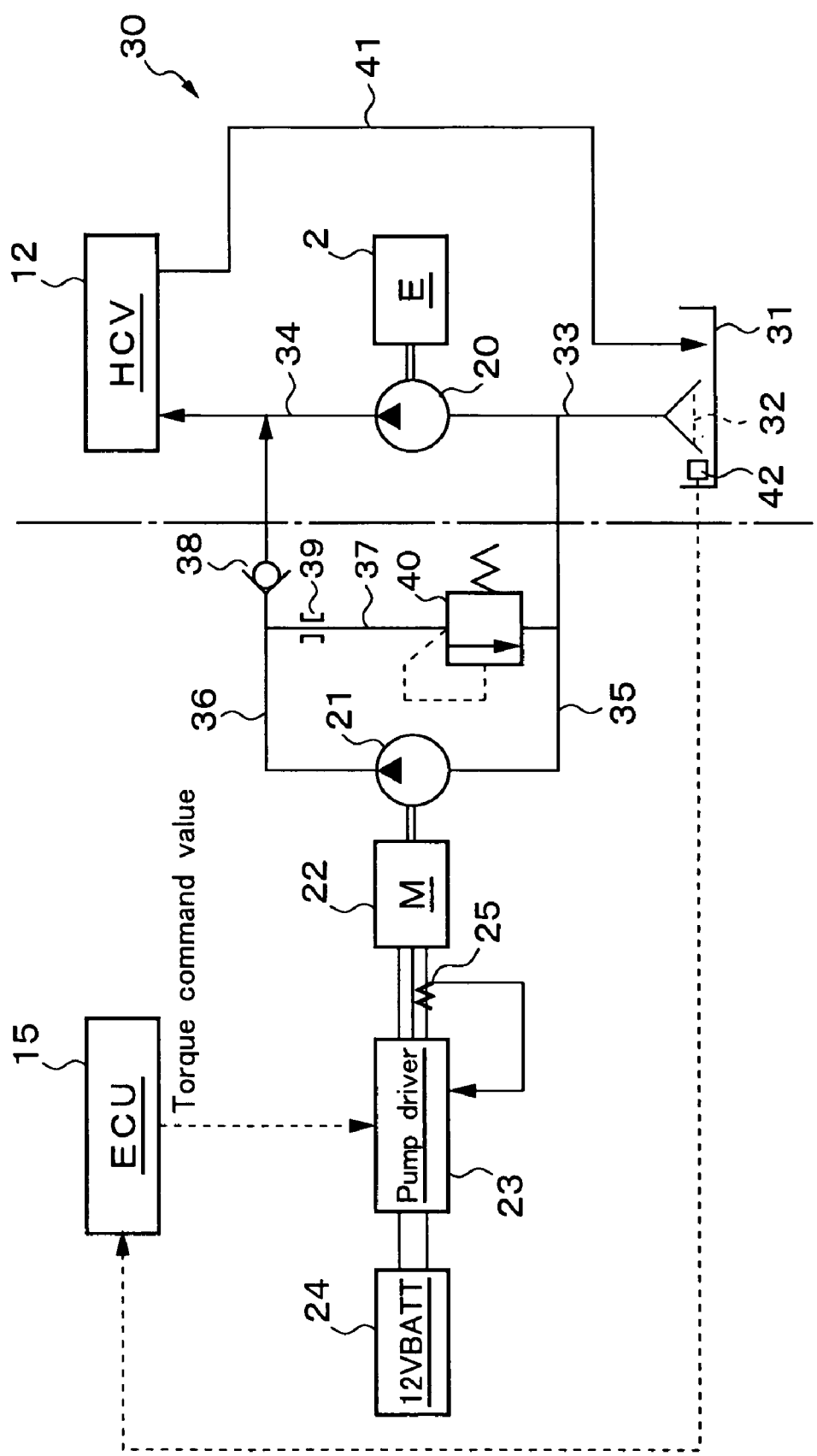
FIG. 2 is a block diagram describing the construction of the hydraulic pressurizer system.

Now, the hydraulic pressurizer system 30 is described in detail in reference to FIG. 2. The hydraulic pressurizer system 30, which includes an oil pan 31 and a strainer 32, has a circuit that comprises a first oil passage 33, which connects between the strainer 32 and the inlet port of the mechanical oil pump 20, a second oil passage 34, which connects between the outlet port of the mechanical oil pump 20 and the hydraulic control valve 12, a third oil passage 35, which branches from the first oil passage 33 and connects to the inlet port of the electrical oil pump 21, a fourth oil passage 36, which connects from the outlet port of the electrical oil pump 21 to the second oil passage 34, and a fifth oil passage 37, which connects between the third oil passage 35 and the fourth oil passage 36. On the fourth oil passage 36, provided is a check valve 38, which prevents oil coming out of the mechanical oil pump 20 from flowing into the electrical oil pump 21. Also, on the fifth oil passage 37, provided are an orifice 39 and a relief valve 40, which are arranged in this order away from the fourth oil passage 36. The relief valve 40 releases oil from the fourth oil passage 36 to the third oil passage 35 when the pressure in the fourth oil passage 36 rises above a predetermined value. In the following description, the line through which oil discharged from the electrical oil pump 21 is led through the fifth oil passage 37 (with the orifice 39 and the relief valve 40) and returned to the oil pump 21 is referred to as "recirculation circuit".

While the oil pump 20 which is mechanically driven by the engine 2 is operating, oil in the oil pan 31 is sucked from the strainer 32 through the first oil passage 33 into the mechanical oil pump 20, where the oil is pressurized and discharged through the second oil passage 34 to the hydraulic control valve 12. On the other hand, when the engine 2 stops, with the hydraulic pressure from the mechanical oil pump 20 becoming ineffective, the electrical oil pump 21 is actuated by the control unit 15. As a result, oil in the oil pan 31 is sucked from the strainer 32 through the first oil passage 33 and through the third oil passage 35 into the electrical oil pump 21, where the oil is pressurized and discharged through the fourth oil passage 36 to the hydraulic control valve 12.

With this arrangement, even while the engine 2 is not operating under the idling-elimination control, the hydraulic pressure necessary is provided by the electrical oil pump 21. This provision can solve the above mentioned problem of a delay in the rise of the hydraulic pressure at the time of the restarting of the engine 2 and thereby prevent a delay in the response for restarting the vehicle. By the way, the hydraulic oil supplied through the hydraulic control valve 12 to the lock-up clutch 5 and the automatic ratio-change mechanism 7 is returned through a sixth oil passage 41 to the oil pan 31.

In this embodiment, the electrical motor 22, which drives the electrical oil pump 21, comprises a brush-less sensor-less motor, whose rotor has permanent magnets and is surrounded by stator coils. The rotational speed of the motor is controlled by adjusting the pulse voltage being applied to the stator coils by the pump driver 23, and the pulse voltage is controlled by a method of pulse width modulation (PWM), which adjusts the pulse width.

In such a brush-less motor, it is necessary to control the pulse voltage, which is applied to the stator coils, in correspondence to the positions of the permanent magnets of the rotor. Therefore, the operation of the pump driver 23 includes a positioning and synchronizing mode, in which the electrical power supplied to the electrical motor 22 is cut off momentarily to let the electrical motor 22 run freely and generate electricity as a synchronous generator by the internal permanent magnets, and the rotational position of the rotor is determined from the voltage output from the electrical motor 22. In this way, the electrical motor 22 is operated precisely by controlling the pulse voltage (this operational mode is referred to as "sensor-less mode").

The electrical oil pump 21, which is mounted in the hybrid vehicle 1, is to maintain the function of the ratio-change mechanism 7 during the stoppage of the engine 2 under the idling-elimination control, whose purpose is to improve fuel economy. Therefore, the electrical oil pump 21 should be operated in a power-saving mode, so it is desirable to control the electrical motor 22 to provide a pump-driving torque that is hardly affected by the temperature and viscosity of the oil. To achieve this, the control unit 15 outputs to the pump driver 23 a torque command value that indicates the value of the torque to be output by the electrical motor 22.

There is a proportional relation between the value of the torque output from the electrical motor 22 (or the pump-driving torque) and that of the electric current flowing through the stator coils (this is referred to as "coil-operating current"). Therefore, for controlling the electrical motor 22, in response to the torque command value received from the control unit 15, the pump driver 23 measures the value of the coil-operating current by a current sensor 25 and controls the current to bring the measured value to a predetermined value or predetermined torque (this control is referred to as "torque control"). On the other hand, if the voltage value being applied to the electrical motor 22 were used for the precise control of the electrical motor 22, then the system would become more complicated because the method based on the voltage is likely to be affected from changes in the source voltage being applied and from fluctuations in the resistance of the harness.

The control unit 15 periodically receives values in the rotational speed Np and in the torque output (pump-driving torque) of the electrical motor 22 from the pump driver 23, and it also receives the value (oil temperature T) detected by an oil-temperature sensor 42, which is provided in the oil pan 31 for measuring the temperature of the hydraulic oil.

Figure 3:
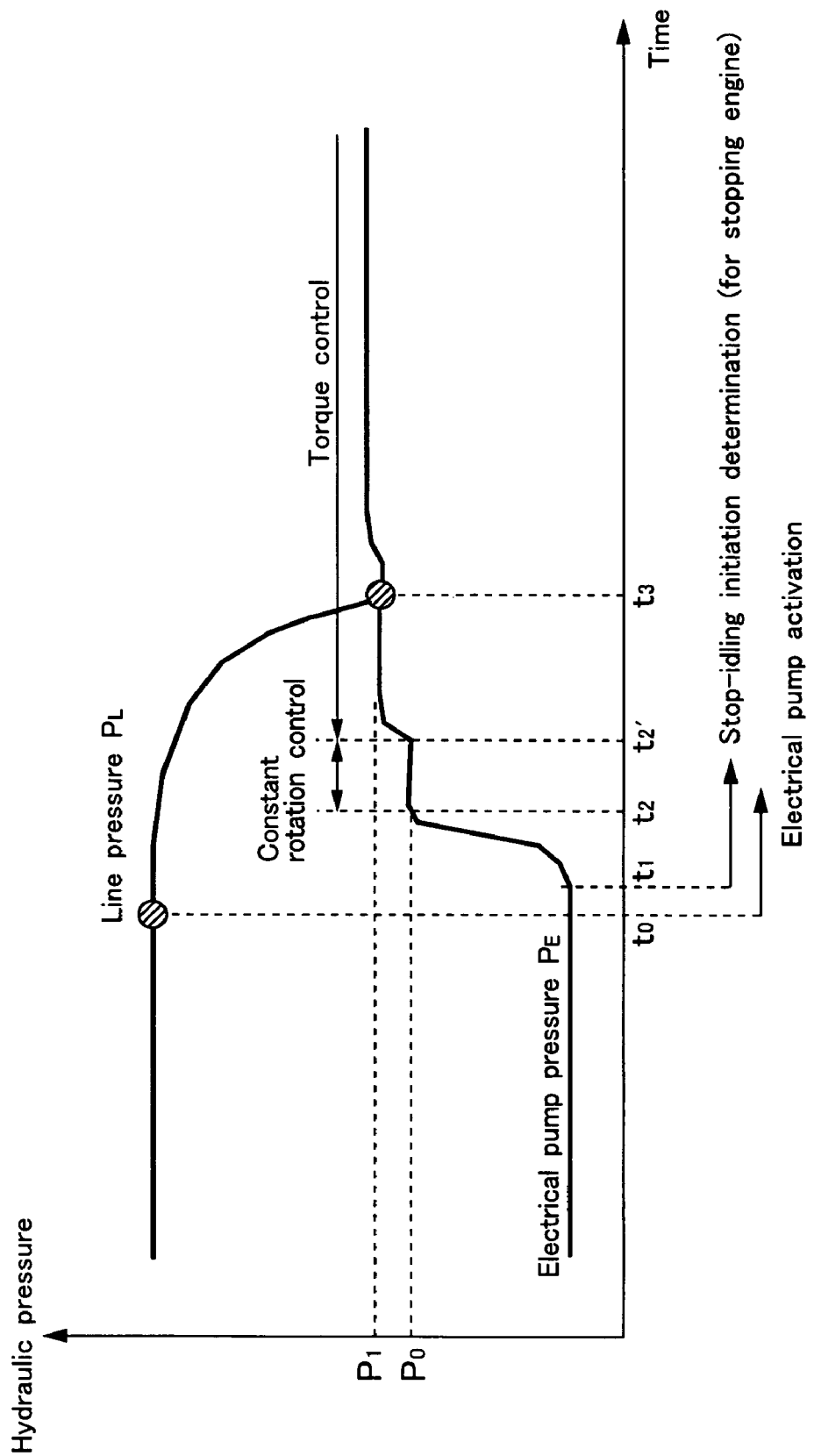
FIG. 3 is a graph showing chronological changes in the line pressure and in the hydraulic pressure of the electrical oil pump.

In the hybrid vehicle 1, which is constructed as described above, the control unit 15 activates the electrical motor 22 to operate the electrical oil pump 21 before the vehicle speed becomes zero after the stoppage of the engine 2 under idling-elimination control. For this instance, FIG. 3 shows the relation between the hydraulic pressure (line pressure $P_L$) provided to the hydraulic control valve 12 and the hydraulic pressure (electrical pump pressure $P_E$) applied by the electrical oil pump 21. In other words, if the conditions for stopping the engine idling are satisfied, and the vehicle speed becomes lower than a predetermined value (at time $t_0$ in FIG. 3), then the control unit 15 activates the electrical motor 22 to operate the electrical oil pump 21 in preparation for stopping the engine idling. Even though the electrical oil pump 21 is brought into operation, it takes a little while for the electrical pump pressure $P_E$ to start rising. In this embodiment, the electrical pump pressure $P_E$ starts rising actually at time $t_1$ as shown in FIG. 3. On the other hand, if the vehicle speed decreases from the speed at time $t_0$ further down to a predetermined vehicle speed (at time $t_1$ in FIG. 3), the operation of the engine 2 is stopped. As a result, the output of the mechanical oil pump 20 decreases with a decrease in the line pressure $P_L$. When the electrical pump pressure $P_E$ reaches a predetermined value or the pressure $P_0$ at which the relief valve 40 is released open (at time $t_2$ in FIG. 3), the relief valve 40 opens to let the hydraulic oil flow into the recirculation circuit.

Thereafter, when the line pressure $P_L$ and the electrical pump pressure $P_E$ become equal to each other (at time $t_3$ in FIG. 3), the check valve 38 opens to let the oil discharged from the electrical oil pump 21 flow into the hydraulic control valve 12.

By the way, in a condition where air bubbles exist in the hydraulic circuit on the side of the electrical oil pump 21, if the electrical oil pump 21 sucks bubbles, then it can skid momentarily. For this momentary skidding, the load acting on the electrical motor 22 decreases, so the torque also decreases, resulting in a decrease in the coil-operating current. In response to this, the pump driver 23 acts to increase the coil-operating current in an attempt to maintain the torque to the torque command value. As a result, there has been a possibility that a large fluctuation in the load induce instability in the operation of the electrical motor 22.

In this embodiment, the hydraulic pressure $P_0$ at which the relief valve 40 is released is set lower than the pressure $P_1$ at which the hydraulic oil is supplied by the electrical oil pump 21 to the hydraulic control valve 12. By this arrangement, the oil is circulated through the recirculation circuit before the check valve 38 opens to let the oil flow from the electrical oil pump 21 to the hydraulic control valve 12. Therefore, even if air bubbles exist in the hydraulic oil on the side of the electrical oil pump 21 in the hydraulic circuit, i.e., in the third oil passage 35 and the fourth oil passage 36, the bubbles are agitated and dispersed again while the oil is circulating through the recirculation circuit. As a result, by the time when the check valve 38 opens to let the oil flow to the hydraulic control valve 12, the electrical oil pump 21 has been enabled to operate in stable condition.

In addition, the relief valve 40, which is provided on the fifth oil passage 37, is set at a predetermined pressure so that when the fourth oil passage 36 reaches this pressure, it will open and let the oil circulate through the recirculation circuit. This arrangement enables the electrical motor 22 to operate stably at a minimum rotational speed. Otherwise, such a three-phase sensor-less brush-less motor may become unstable if it is operated at a low rotational speed outside its optimal operational range.

In the above described circuit arrangement, while hydraulic oil is being discharged from the electrical oil pump 21, the oil is always circulating through the recirculation circuit. As a result, the ripple of the hydraulic oil discharged from the electrical oil pump 21 is kept relatively small, so the electrical motor 22, which is in sensor-less mode, is controlled stably. Otherwise, the operation of such a sensor-less brush-less motor can become unstable if there is a sudden change in the load which change is beyond the range of allowable fluctuation for optimal operation of the motor.

Furthermore, the relief valve 40, which is provided on the fifth oil passage 37, can act to prevent pressure decrease in a case where the flow of hydraulic oil required to the automatic ratio-change mechanism 7 increases rapidly acting to decrease the hydraulic pressure momentarily, because the relief valve 40 closes and cuts the flow of the hydraulic oil through the recirculation circuit. Moreover, in a case where air bubbles are mixed into the oil, which results in an abnormal drop in the hydraulic pressure, the relief valve 40 closes, blocking the flow through the recirculation circuit. As a result, the air bubbles are discharged or drained to the automatic ratio-change mechanism 7, so the hydraulic circuit can return into normal condition quickly.

As described above, in the hydraulic pressurizer system 30, the hydraulic pressure of the oil discharged from the electrical oil pump 21 is adjusted by controlling the pump-driving torque of the electrical motor 22. However, the hydraulic oil has a characteristic that its viscosity changes as the temperature of the oil changes. In the torque control of the electrical motor 22, the viscosity decreases as the oil temperature T rises, and accordingly, the rotational speed Np of the electrical motor 22 increases as shown in FIG. 4.

By the way, in the torque control of the hydraulic pressurizer system 30, the relation between the temperature T of the hydraulic oil and the rotational speed Np of the electrical motor 22 is affected not only by deviations in the quality of the electrical motor 22 as a manufactured product, but also by deviations in the quality of the other components constituting the hydraulic pressurizer system 30 and the automatic ratio-change mechanism 7, and further by the individually different aging of the respective components. Therefore, the hydraulic pressurizer system 30 has an individually different characteristic value CV for the relation between the oil temperature T and the motor rotational speed Np, and the characteristic value CV, which is represented as the inclination of the line in the graph shown in FIG. 4 and calculated by Np/T, is affected by the aging of the system as mentioned above.

Figure 4:
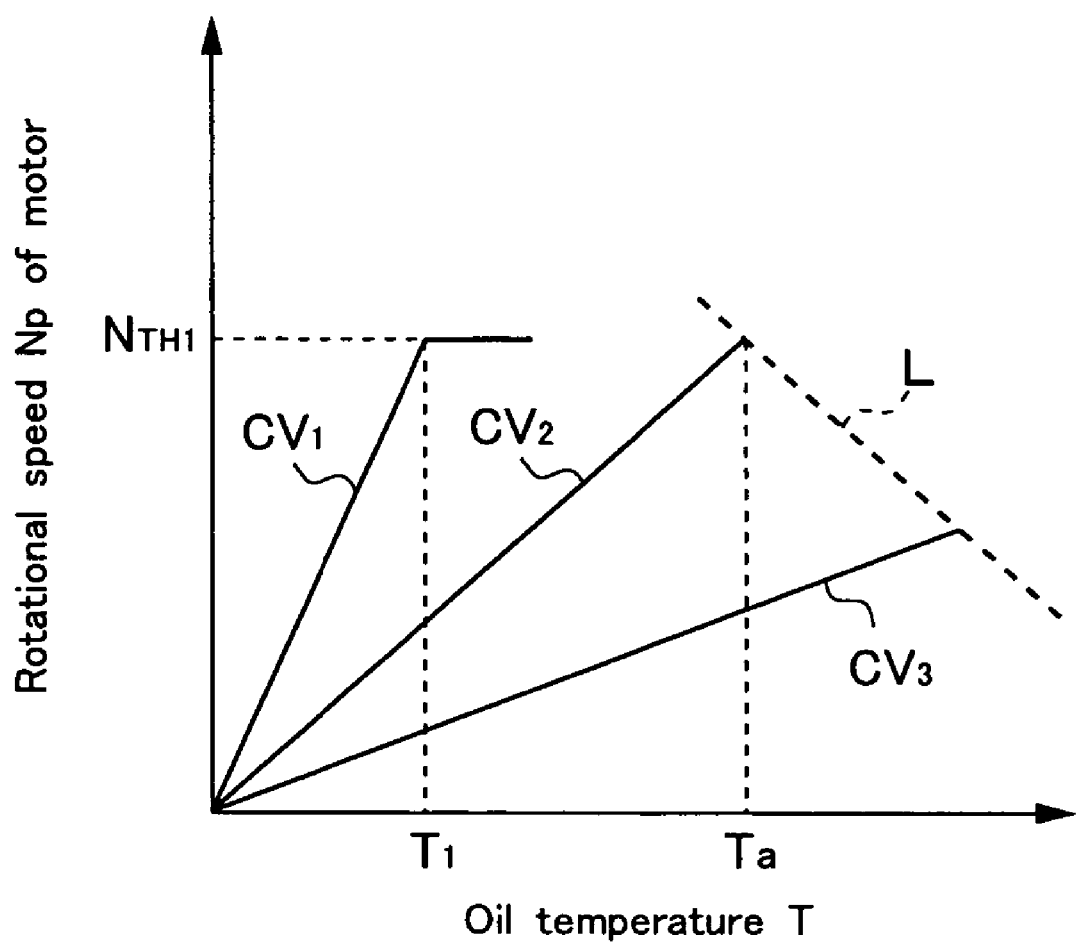
FIG. 4 is a graph showing relations between the oil temperature and the rotational speed of the electrical motor.

In a case where the hydraulic pressurizer system 30 has characteristic value $CV_1$ shown in FIG. 4, as the oil temperature T rises, the electrical motor 22 cannot output the required pump-driving torque unless it is capable of operating at a correspondingly high rotational speed. However, there is a limit to the operational rotational speed Np of the electrical motor 22. In this shown case, the rotational speed Np of the electrical motor 22 reaches the limit before the temperature of the hydraulic oil achieves an oil temperature Ta at which the hydraulic pressurizer system 30 operates normally. For such a case, the pump driver 23 according to the present invention controls the electrical motor 22 to maintain the rotational speed $N_{TH1}$ at the limit value after the rotational speed Np of the electrical motor 22 reaches the limit value $N_{TH1}$ (at oil temperature $T_1$ in FIG. 4).

In this case, as the electrical motor 22 is controlled to maintain the rotational speed Np constantly, the pump-driving torque (coil-operating current) decreases in adverse correspondence to the rise in the oil temperature. The control unit 15 calculates the difference between the value of the pump-driving torque, which is calculated from the value of the coil-operating current (this value is being fed from the pump driver 23 to the control unit 15 as mentioned above), and the torque command value, which is instructed by the control unit 15. If this difference becomes equal to or greater than a predetermined value, then the control unit 15 cancels the stop-engine-idling control and starts the engine 2 and then stops the electrical motor 22. As a result, the source of the hydraulic pressure is switched from the electrical oil pump 21 to the mechanical oil pump 20.

Figure 5:
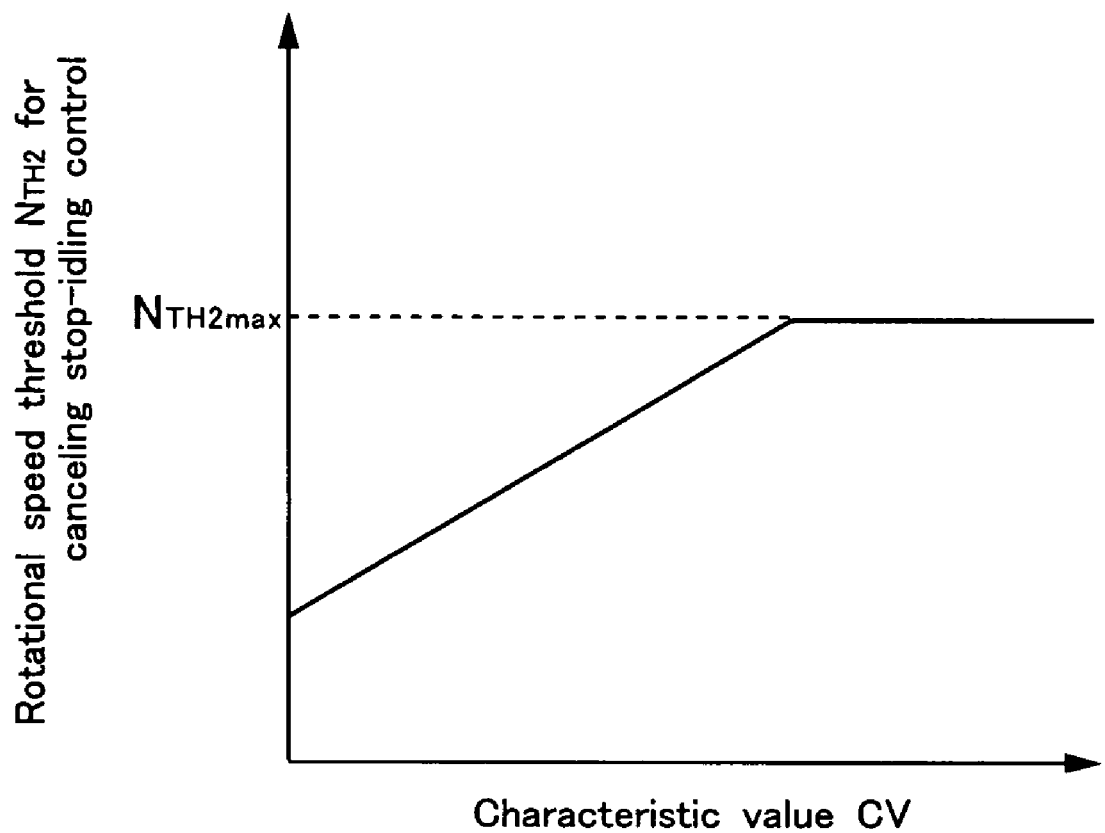
FIG. 5 is a graph showing a relation between the characteristic value and the threshold for the rotational speed of the electrical motor.

On the other hand, in a case where the hydraulic pressurizer system 30 has characteristic value $CV_2$ or characteristic value $CV_3$ shown in FIG. 4, if the control unit 15 determines the cancellation of the idling-stop control from the rotational speed Np of the electrical motor 22 as described above, then the temperature of the hydraulic oil can rise excessively. To avoid this excessive rise in the oil temperature, the control unit 15 has in memory a predetermined table (referred to as "table for characteristic values vs rotational speed thresholds") that lists characteristic values CV and their corresponding threshold values $N_{TH2}$ for the rotational speed in canceling the idling-stop control as shown in FIG. 5. The control unit 15 compares the rotational speed Np output from the pump driver 23 with the threshold value $N_{TH2}$ that corresponds to the characteristic value CV in the table, and it cancels the idling-stop control if the rotational speed Np is above the threshold value $N_{TH2}$ (condition for canceling the idling-stop control is indicated by limit line L in FIG. 4).

Here, in the relation between the characteristic value CV and the threshold value $N_{TH2}$ for the rotational speed Np, both the values are proportional with each other up to a predetermined rotational speed. Therefore, the larger the characteristic value CV, the larger the threshold value $N_{TH2}$ for the rotational speed. However, because the rotational speed Np of the electrical motor 22 has a limit as mentioned above, there is a limit value $N_{TH2max}$ for the threshold value. Even though the characteristic value CV increases, the threshold value $N_{TH2}$ for the rotational speed never goes beyond the limit value $N_{TH2max}$.

As described above, the control unit 15 determines the cancellation of the idling-stop control on the basis of the characteristic value CV of the hydraulic pressurizer system 30. However, because the characteristic value CV itself is affected by the aging of the hydraulic pressurizer system 30, it should be updated periodically from the oil temperature T and the rotational speed Np. Therefore, now, the operation of the control unit 15 for updating the characteristic value CV and for determining the cancellation of the idling-stop control is described in reference to FIG. 6.

Figure 6:
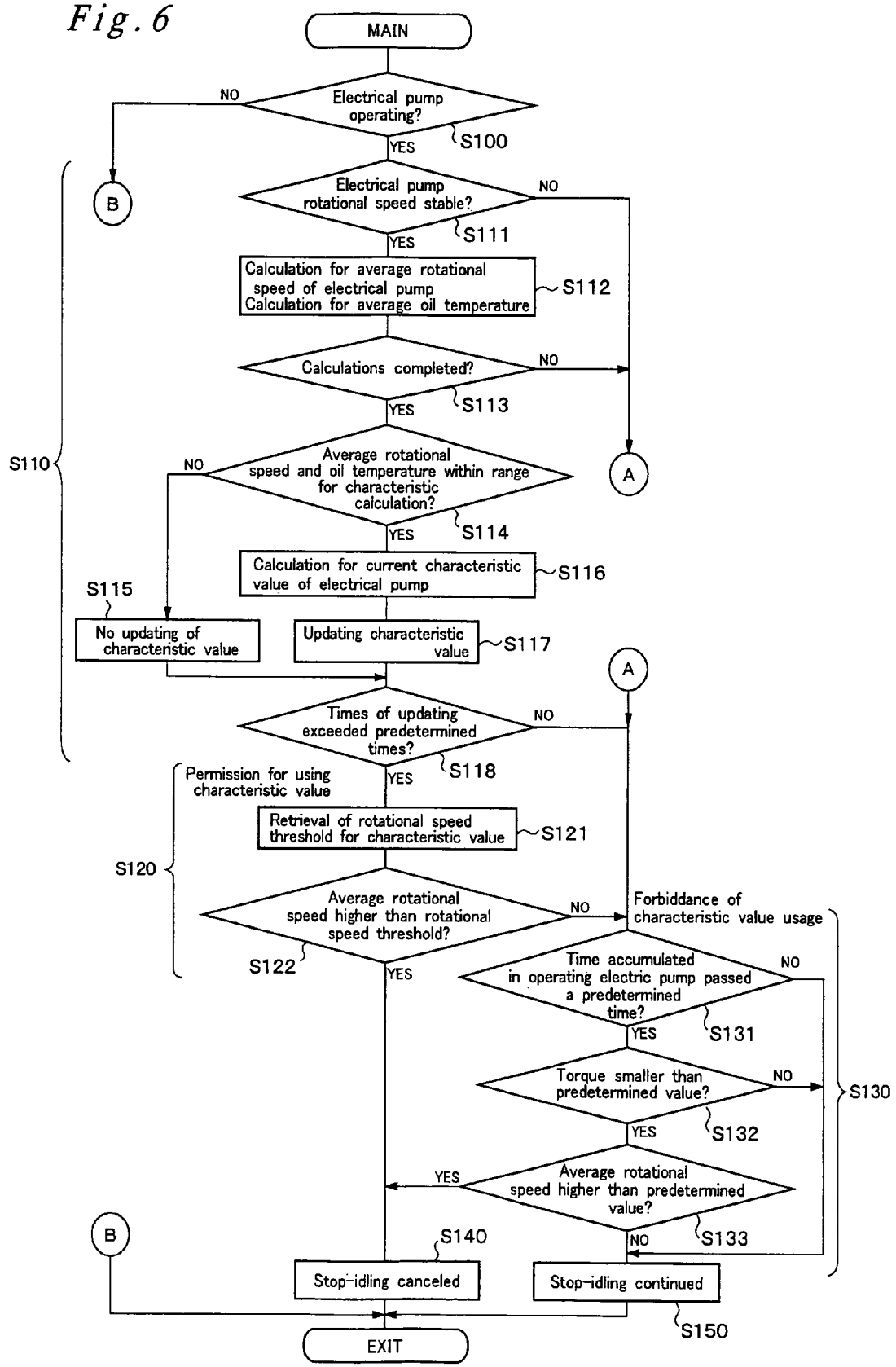
FIG. 6 is a flow chart showing the steps of an operation for determining a cancellation of the idling-stop control.

The control unit 15 executes periodically the determination shown in FIG. 6 for canceling the idling-stop control after starting it. In the determination for canceling the idling-stop control, at first, a determination is made at S100 whether the electrical oil pump 21 is in operation or not. If the result of the determination is that it is not in operation, then the control flow exits this turn of the determination for canceling the idling-stop control. On the other hand, if the result is that the electrical oil pump 21 is in operation, then the following steps are executed to perform a characteristic value updating operation S110, a characteristic value usage permitting operation S120, a characteristic value usage forbidding operation S130, an idling-stop control cancellation operation S140, and an idling-stop keeping operation S150. In the characteristic value updating operation S110, a characteristic value CV is calculated from the current oil temperature T of the hydraulic pressurizer system 30 and the current rotational speed Np, and the calculated value is memorized in the control unit 15 or used to update the existing value. In the characteristic value usage permitting operation S120, the characteristic value CV is used to make a determination for canceling the idling-stop control, and in the characteristic value usage forbidding operation S130, a determination for canceling the idling-stop control is made without using the characteristic value CV. Based on the determination made, the idling-stop control is cancelled in the idling-stop control cancellation operation S140, or the idling-stop control is hold in the idling-stop keeping operation S150.

More specifically, in the characteristic value updating operation S110, a determination is made at S111 whether the rotational speed Np of the electrical oil pump 21 is stable or not. This is to determine whether it is necessary to update the characteristic value CV memorized in the control unit 15 or not. In this case, a calculation is executed for a deviation in the rotational speed Np, whose data are fed from the pump driver 23, and if this deviation is within a predetermined range, then the rotational speed Np of the electrical oil pump 21 is judged stable. If the result of the determination at S111 is that the rotational speed Np is stable, then calculations are made at S112 for an average rotational speed Np and for an average oil temperature T for a predetermined time period in this stable condition, and a determination is made at S113 whether the calculations for average values have completed or not. If the result of the determination at S111 is that the rotational speed Np is unstable, then the characteristic value usage forbidding operation S130, which will be detailed later, is executed.

Figure 7:
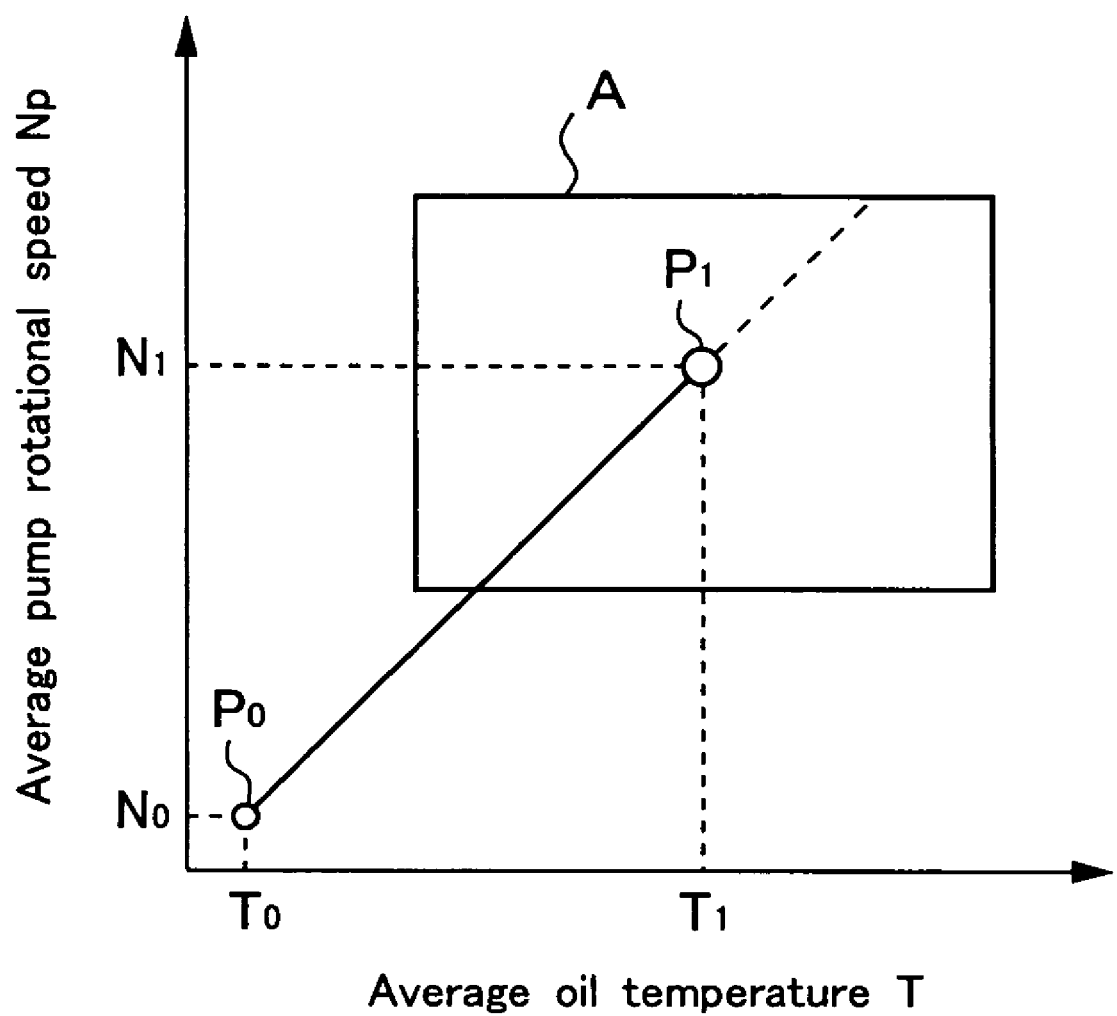
FIG. 7 is a graph for describing a method for calculating a characteristic value.

If the result of the determination at S113 is that the calculations have completed, then another determination is made at S114 whether or not the average rotational speed Np and the average oil temperature T are within a characteristic calculation range A shown in FIG. 7. If they are within the range, a calculation is made for the characteristic value of the electrical oil pump 21 from the value $P_1$ calculated from the average rotational speed Np and the average oil temperature T, which calculation will be described in detail later. In the case where the value $P_1$ calculated from the average rotational speed Np and the average oil temperature T is not within the characteristic calculation range A, there is a possibility that abnormality exist in the measurement. The values that are not within the range are not reflected or used for the update of the characteristic value CV of the hydraulic pressurizer system 30. If the result of the determination at S113 is that the calculations have not completed yet, then the control unit 15 executes the characteristic value usage forbidding operation S130.

As expected from the above description, if the calculated value $P_1$ is not within the characteristic calculation range A, then the characteristic value CV is not updated at S115. On the other hand, if it is within the range A, then the characteristic value CV of the hydraulic pressurizer system 30 is calculated at S116, and this calculated value is stored into the storage area of the control unit 15 or used to update the existing value at S117. Here, in the calculation for the characteristic value CV, characteristic value $CV_n$ is calculated by the following equation (1) from value $P_1$ calculated as mentioned above and a predetermined point $P_0$ ($T_0$, $N_0$) shown in FIG. 7.

$$CV_n = (N_1 - N_0)/(T_1 - T_0) \quad (1)$$

Because the characteristic value CV, which is stored in the control unit 15, is always updated under the predetermined condition as described above, the updating characteristic value $CV_{n+1}$ is calculated by the following equation (2) from characteristic value $CV_n$, which is calculated by above equation (1), and from characteristic value $CV_{n-1}$, which is the value before the updating.

$$CV_{n+1} = CV_{n-1} \times (1-W) + CV_n \times W \quad (2)$$

W: weighting coefficient

Here, the updating characteristic value $CV_{n+1}$ is calculated with a weighting coefficient from the calculated characteristic value $CV_n$ and the pre-update characteristic value $CV_{n-1}$. In this way, the results of the updates that have been executed before this session are taken into consideration to exclude errors for achieving an accurate characteristic value CV.

Moreover, how many times the characteristic value CV has been updated is stored at step S117, which has been already described above, and a determination is made at S118 whether the number of times that the characteristic value has been updated has reached a predetermined number of times or not. If the characteristic value has been updated the predetermined number of times or more, then the control unit 15 executes the characteristic value usage permitting operation S120. On the other hand, if the number of times for the updates has not reached the predetermined number of times yet, then the control unit 15 executes the characteristic value usage forbidding operation S130, which forbids the use of the characteristic value CV stored in memory because there is a possibility that the characteristic value CV still include an error.

In the execution of the characteristic value usage permitting operation S120, the rotational speed threshold value $N_{TH2}$ is retrieved at S121 on the basis of the characteristic value CV in memory from the table for characteristic values vs rotational speed thresholds, which is stored in the control unit 15 as shown in FIG. 5. Then, a determination is made at S122 whether the average rotational speed Np is equal to or higher than the rotational speed threshold value $N_{TH2}$ or not. If the result of the determination is that it is equal to or higher than the threshold value $N_{TH2}$, then the control unit 15 cancels the idling-stop control at S140. On the other hand, if the average rotational speed Np is lower than the threshold value $N_{TH2}$, the control unit 15 executes the characteristic value usage forbidding operation S130.

In the characteristic value usage forbidding operation S130, the control unit 15 stores the time that has accumulated in operating the electrical oil pump 21 for the idling-stop control, and a determination is made at S131 whether this accumulated time has exceeded a predetermined time or not. If the accumulated time has not exceeded the predetermined time, then the control unit keeps the idling-stop control effective at S150. On the other hand, if the accumulated time has exceeded the predetermined time, then a determination is made at S132 whether the pump-driving torque is equal to or smaller than a predetermined value or not. If the torque is not equal to or smaller than the predetermined value, then the control unit keeps the idling-stop control effective at S150. If the result of the determination at S132 is that the torque is equal to or smaller than the predetermined value, then another determination is made at S133 whether the average rotational speed Np is equal to or higher than the limit value $N_{TH1}$ or not. If the result of the determination is that the rotational speed Np is equal to or higher than the limit value $N_{TH1}$, then the control unit cancels the idling-stop control at S140. On the other hand, if the result is that the rotational speed Np is not equal to or higher than the limit value $N_{TH1}$, then the control unit keeps the idling-stop control effective at S150.

As described above, the control unit 15 memorizes the characteristic value CV of the hydraulic pressurizer system 30 and renews it every time when the electrical oil pump 21 is activated in the idling-stop control. By this renewal, the operational range of the electrical oil pump 21 (or the electrical motor 22) is determined in consideration of the characteristic value CV of the individual electrical oil pump 21 and the individual automatic ratio-change mechanism 7, which products have, respectively, unevenness in their manufactured quality and are affected by the aging of their components. As a result, the cancellation of the idling-stop control can be determined correspondingly to the performance of the individual hydraulic pressurizer system.

Additionally, in the above described embodiment, the hydraulic pressurizer system according to the present invention can be arranged as follow. Even in a case where the electrical oil pump 21 does not reach the rotational speed Np that is determined by the above described operation, if the pump-driving torque of the electrical motor 22 is decreasing, then the control unit cancels the idling-stop control because there is a possibility that the electrical oil pump 21 cannot perform as required. In this case, the control unit starts the engine 2 so that hydraulic oil is supplied by the mechanical oil pump 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2004-349644 filed on Dec. 2, 2004, which is incorporated herein by reference.

What is claimed is:

1. A hydraulic pressurizer system comprising:
   a drive source for driving a vehicle;
   a mechanical oil pump, which is driven by said drive source;
   an electrical motor, which is activated by a battery;
   an electrical oil pump, which is driven by said electrical motor;
   a ratio-change mechanism, which is actuated by means of hydraulic oil being supplied from said mechanical oil pump and from said electrical oil pump for establishing a speed change ratio, at which a rotational driving force from said drive source is transmitted to wheels with a rotational speed change; and
   a control unit, which activates said electrical motor;
   wherein:
   said control unit stores in memory a characteristic value and a threshold value for a rotational speed of said electrical motor, said characteristic value being calculated from a temperature of said hydraulic oil and the rotational speed of said electrical motor, and said threshold value corresponding to said characteristic value; and
   if the rotational speed of said electrical motor becomes equal to or higher than said threshold value for said rotational speed, which threshold value is determined from said characteristic value, while said control unit, having stopped said drive source, is supplying said hydraulic oil from said electrical oil pump to said ratio-change mechanism, then said control unit starts said drive source to supply said hydraulic oil from said mechanical oil pump to said ratio-change mechanism and then stops said electrical oil pump.

2. The hydraulic pressurizer system as set forth in claim 1, wherein:
   said control unit controls said electrical motor to output a predetermined torque by controlling a value of an electrical current flowing through stator coils of said electrical motor to a predetermined value.

3. The hydraulic pressurizer system as set forth in claim 1, wherein:
   said characteristic value CV is set as value (Np/T) of said rotational speed Np of said electrical motor divided by said oil temperature T; and
   although said threshold value increases as said characteristic value CV increases, after reaching a maximum value, said threshold value remains at said maximum value even if said characteristic value CV increases.

4. The hydraulic pressurizer system as set forth in claim 1, further comprising an oil-temperature sensor, which detects the temperature of said hydraulic oil;
   wherein:
   said control unit, having started said electrical oil pump, calculates a new characteristic value from said temperature detected by said oil-temperature sensor and from said rotational speed of said electrical motor and updates said characteristic value stored in memory.

5. The hydraulic pressurizer system as set forth in claim 1, wherein:
   said electrical motor comprises a three-phase brush-less sensor-less motor.

* * * * *